United States Patent
Jung et al.

(10) Patent No.: US 11,049,270 B2
(45) Date of Patent: Jun. 29, 2021

(54) METHOD AND APPARATUS FOR CALCULATING DEPTH MAP BASED ON RELIABILITY

(71) Applicant: Samsung Electronics Co., Ltd., Suwon-si (KR)

(72) Inventors: Hwiryong Jung, Seoul (KR); Sunghoon Hong, Hwaseong-si (KR); Chul Woo Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 15/877,483

(22) Filed: Jan. 23, 2018

(65) Prior Publication Data

US 2019/0080462 A1    Mar. 14, 2019

(30) Foreign Application Priority Data

Sep. 14, 2017 (KR) .................. 10-2017-0117962

(51) Int. Cl.
| | | |
|---|---|---|
| *G06K 9/36* | (2006.01) | |
| *G06T 7/50* | (2017.01) | |
| *G06T 7/11* | (2017.01) | |
| *G06T 7/20* | (2017.01) | |
| *G06K 9/00* | (2006.01) | |
| *H04N 13/261* | (2018.01) | |
| *G06T 7/174* | (2017.01) | |
| *H04N 13/271* | (2018.01) | |

(Continued)

(52) U.S. Cl.
CPC ............ *G06T 7/50* (2017.01); *G06K 9/00201* (2013.01); *G06K 9/00664* (2013.01); *G06T 7/11* (2017.01); *G06T 7/174* (2017.01); *G06T 7/20* (2013.01); *G06T 7/579* (2017.01); *G06T 7/73* (2017.01); *H04N 13/261* (2018.05); *H04N 13/271* (2018.05); *G06T 2207/30244* (2013.01)

(58) Field of Classification Search
CPC .... G06T 7/50; G06T 7/20; G06T 7/11; H04N 13/271; H04N 13/261; G06K 9/00201
USPC ....................................... 382/285
See application file for complete search history.

(56) References Cited

U.S. PATENT DOCUMENTS

| | | |
|---|---|---|
| 7,425,955 B2 | 9/2008 | Long et al. |
| 7,590,262 B2 | 9/2009 | Fujimura et al. |
| 7,831,094 B2 | 11/2010 | Gupta et al. |

(Continued)

FOREIGN PATENT DOCUMENTS

JP    2000-132691 A    5/2000

OTHER PUBLICATIONS

Klein, Georg, et al. "Parallel Tracking and Mapping for Small AR Workspaces." *Proceedings of the 6th IEEE and ACM International Symposium on Mixed and Augmented Reality*, Nov. 2007, Nara, Japan (10 pages in English).

(Continued)

*Primary Examiner* — Andrew M Moyer
(74) *Attorney, Agent, or Firm* — NSIP Law (57) ABSTRACT

A method of calculating a depth map includes dividing an input image into segments, calculating reliabilities of the segments, selecting at least one of the segments based on the reliabilities, estimating pose information of a camera with respect to the input image using the selected segment, and calculating a depth map of the input image based on the pose information of the camera.

24 Claims, 8 Drawing Sheets

(51) Int. Cl.
*G06T 7/73* (2017.01)
*G06T 7/579* (2017.01)

(56) References Cited

U.S. PATENT DOCUMENTS

| | | |
|---|---|---|
| 9,202,287 B2 | 12/2015 | Jung |
| 9,406,140 B2 | 8/2016 | Lee et al. |
| 2011/0273529 A1 | 11/2011 | Lai et al. |
| 2014/0049612 A1* | 2/2014 | Ishii ................ G01B 11/00 348/46 |
| 2014/0362193 A1* | 12/2014 | Kanetake ............ G01S 1/00 348/50 |
| 2015/0254529 A1 | 9/2015 | Lv et al. |
| 2016/0171703 A1* | 6/2016 | Rhee .................. G06T 7/80 382/154 |
| 2016/0350930 A1 | 12/2016 | Lin et al. |
| 2016/0358337 A1 | 12/2016 | Dai et al. |
| 2017/0132769 A1 | 5/2017 | Barron et al. |
| 2017/0148223 A1 | 5/2017 | Holzer et al. |
| 2018/0189565 A1* | 7/2018 | Lukierski ............ G06T 7/579 |
| 2019/0026943 A1* | 1/2019 | Yan .................... G06T 7/579 |
| 2019/0065865 A1* | 2/2019 | Pink ................... B60T 7/12 |

OTHER PUBLICATIONS

Engel, Jakob, et al., "LSD-SLAM: Large-Scale Direct Monocular SLAM." *Proceedings of the European Conference on Computer Vision.* Sep. 2014, Zurich, Switzerland (16 pages in English).

Badrinarayanan, Vijay, et al., "Segnet: A Deep Convolutional Encoder-Decoder Architecture for Image Segmentation." *IEEE Transaction on Pattern Analysis and Machine Intelligence*, vol. 39, Issue 12, Dec. 2007 (pp. 1-14).

Mur-Artal, Raul, et al. "ORB-SLAM: A Versatile and Accurate Monocular SLAM System." *IEEE Transactions on Robotics*, vol. 31, No. 5, Oct. 2015, (pp. 1147-1163).

Tateno, Keisuke et al., "Real-Time and Scalable Incremental Segmentation on Dense SLAM." *Proceedings of the International Conference on Intelligent Robots and Systems (IROS)*, Sep. 2015, Hamburg, Germany (8 pages in English).

* cited by examiner

METHOD AND APPARATUS FOR CALCULATING DEPTH MAP BASED ON RELIABILITY

CROSS-REFERENCE TO RELATED APPLICATIONS

This application claims the benefit under 35 USC 119(a) of Korean Patent Application No. 10-2017-0117962 filed on Sep. 14, 2017, in the Korean Intellectual Property Office, the entire disclosure of which is incorporated herein by reference for all purposes.

BACKGROUND

1. Field

The following description relates to a method and an apparatus for calculating a depth map based on a reliability.

2. Description of Related Art

A two-dimensional (2D) input image is reconstructed as a three-dimensional (3D) image through camera pose estimation and depth estimation. The camera pose estimation and the depth estimation are performed using, for example, structure from motion (SfM) that estimates a structure of an object based on information generated from a motion by a movement of the object, simultaneous localization and mapping (SLAM) that constructs a map of a surrounding environment while simultaneously tracking a pose of a moving camera, or visual odometry (VO) that determines a pose and an orientation by analyzing camera images.

The aforementioned schemes may cause errors through repeated selections with respect to a target region, rather than a target object to be tracked in an image, and/or unnecessary loss of computational resources by tracking a moving object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of calculating a depth map includes dividing an input image into segments; calculating reliabilities of the segments; selecting at least one of the segments based on the reliabilities; estimating pose information of a camera with respect to the input image based on the selected segment; and calculating a depth map of the input image based on the pose information of the camera.

The dividing may include either one or both of dividing the input image into semantic segments by classifying an object included in the input image as a semantic unit; and dividing the input image into depth segments based on a depth value of the input image.

The calculating of the reliabilities may include either one or both of calculating first reliabilities of the semantic segments; and calculating second reliabilities of the depth segments.

The calculating of the first reliabilities may include calculating the first reliabilities of the semantic segments based on whether the object included in the input image is a moving object.

The calculating of the first reliabilities may further include determining, in response to the object being a moving object, a first reliability of a semantic segment corresponding to the moving object to be a first value; and determining, in response to the object being a stationary object, a first reliability of a semantic segment corresponding to the stationary object to be a second value.

The calculating of the reliabilities may further include fusing the first reliabilities and the second reliabilities; and determining the fused reliabilities to be the reliabilities of both the semantic segments and the depth segments.

The method may further include selecting pixels from the selected segment based on the fused reliabilities, and the estimating may include estimating the pose information of the camera from the selected pixels.

The selecting of the pixels may include selecting the pixels from the selected segment in proportion to the fused reliabilities.

The input image may include frames, the frames may include at least one key frame, and the calculating of the reliabilities may include calculating the reliabilities of the segments for each of the at least one key frame.

The estimating may include estimating the pose information of the camera by applying a cost function to the selected segment.

In another general aspect, a non-transitory computer-readable medium store instructions that, when executed by a processor, cause the processor to perform the method described above.

In another general aspect, an apparatus for calculating a depth map includes a camera configured to acquire an input image; and a processor configured to divide the input image into segments, calculate reliabilities of the segments, select at least one of the segments based on the reliabilities, estimate pose information of the camera with respect to the input image based on the selected segment, and calculate a depth map of the input image based on the pose information of the camera.

The processor may be further configured to either one or both of divide the input image into semantic segments by classifying an object included in the input image as a semantic unit, and divide the input image into depth segments based on a depth value of the input image.

The processor may be further configured to either one or both of calculate first reliabilities of the semantic segments, and calculate second reliabilities of the depth segments.

The processor may be further configured to calculate the first reliabilities of the semantic segments based on whether the object included in the input image is a moving object.

The processor may be further configured to fuse the first reliabilities and the second reliabilities, and determine the fused reliabilities to be the reliabilities of both the semantic segments and the depth segments.

The processor may be further configured to select pixels from the selected segment based on the fused reliabilities, and estimate the pose information of the camera from the selected pixels.

The processor may be further configured to select the pixels from the selected segment in proportion to the fused reliabilities.

The input image may include frames, the frames may include at least one key frame, and the processor may be further configured to calculate the reliabilities of the segments for each of the at least one key frame.

The processor may be further configured to estimate the pose information of the camera by applying a cost function to the selected segment.

In another general aspect, a method of calculating a depth map includes selecting at least one portion of an input image captured by a camera, the selected portion having a characteristic enabling accurate pose estimation of the camera; estimating pose information of the camera based on the selected portion; and calculating a depth map of the input image based on the pose information of the camera.

The characteristic enabling accurate pose estimation of the camera may be a characteristic in which the selected portion does not have high-frequency noise and is not a part of a moving object.

The method may further include calculating a reliability of the selected portion; and selecting pixels from the selected portion in proportion to the reliability so that the greater the reliability, the greater the number of pixels that are selected from the selected portion; and the estimating may include estimating the pose information of the camera from the selected pixels.

The method may further include dividing the input image into portions based on classes of semantic units so that each of the portions is classified in one of the classes of semantic units; and the selecting may include selecting the at least one portion from the divided portions.

The classes may include classes of stationary objects and classes of moving objects; and the selecting may include selecting the at least one portion from the classes of stationary objects.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms including "first" and "second" may be used to denote various components, the components are not limited by the terms. These terms have been used merely to distinguish one component from another component. For example, a "first" component alternatively may be referred to as a "second" component, and a "second" component alternatively may be referred to as a "first" component.

When a component is referred to as being "connected to" another component, the component may be directly connected or coupled to the other component, or intervening components may be present. When a component is referred to as "directly connected to" another component, no intervening components may be present.

The singular forms are intended to include the plural forms as well, unless the context clearly indicates otherwise. Terms such as "comprises," "includes," and "has" specify the presence of stated features, numbers, operations, elements, components, or combinations thereof, but do not preclude the presence or addition of one or more other features, numbers, operations, elements, components, or combinations thereof.

Unless otherwise defined herein, all terms used herein, including technical or scientific terms have the same meanings as those generally understood by one of ordinary skill in the art. Terms defined in dictionaries generally used are to be construed to have meanings matching with contextual meanings in the related art, and are not to be construed as an ideal or excessively formal meaning unless otherwise defined herein.

Examples set forth hereinafter may be used to estimate a depth value to reconstruct a three-dimensional (3D) scene of an input image in various augmented reality (AR) application fields. The examples may generate a dense depth map in a short time using images acquired by a single camera, without using an additional hardware element such as a depth camera. The examples may be applied to, for example, an AR head-up display (HUD), AR/virtual reality (VR) glasses, an autonomous vehicle, an intelligent vehicle, a smart phone, and a mobile device to implement AR applications in real time. The examples may be applied to an HUD to track a camera pose and reconstruct a depth for accurate matching between a driving image and a virtual object. The examples may be applied to matching of a smart phone or an AR/VR device in a mobile platform and 3D image reconstruction. The examples may be applied to a drone, a robot, or an autonomous vehicle to control an orientation using vision technology. The examples may be implemented in a form of chip to be mounted on an in-vehicle infotainment (IVI) system, an advanced driver-assistance system (ADAS), a smart phone, or an AR/VR device.

Figure 1:
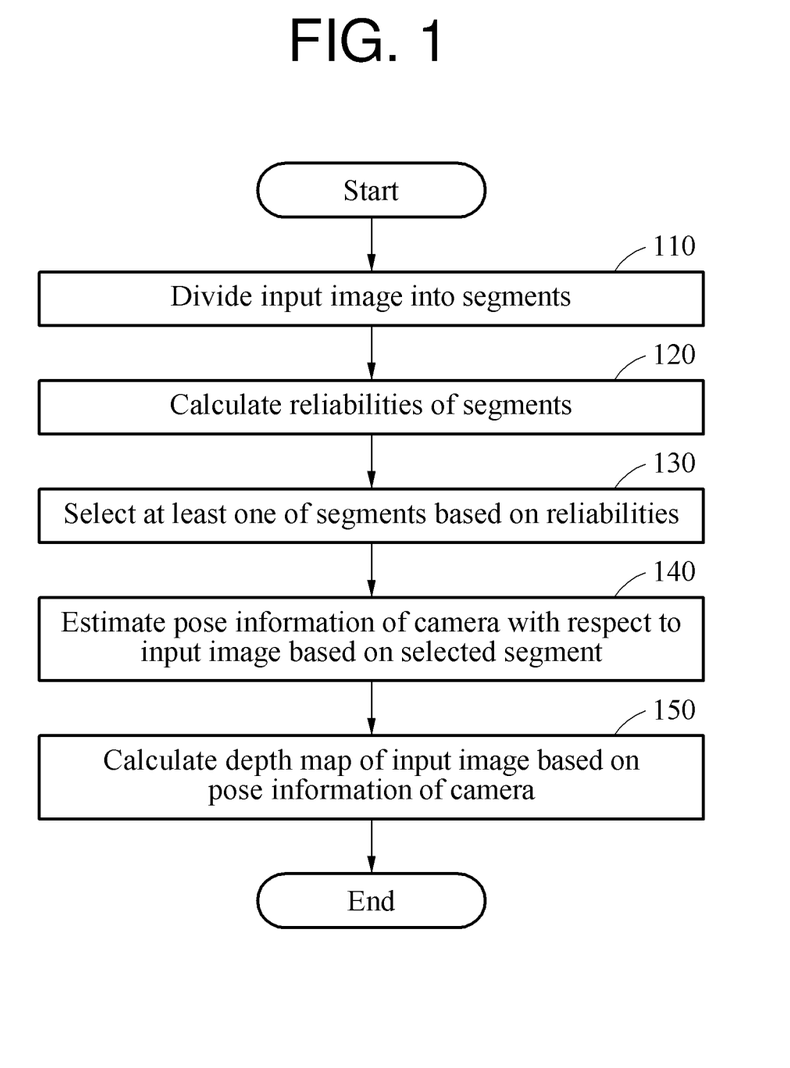
FIG. 1 illustrates an example of a method of calculating a depth map.

FIG. 1 illustrates an example of a method of calculating a depth map. Referring to FIG. 1, in operation 110, an apparatus for calculating a depth map, hereinafter, the "calculation apparatus", divides an input image into segments. The input image is an image input into the calculation apparatus, and is, for example, a live image or a moving picture. The input image may be a monoscopic image or a stereoscopic image. The input image includes a plurality of frames. The input image is captured through a camera included in the calculation apparatus, for example, a camera

Figure 6:
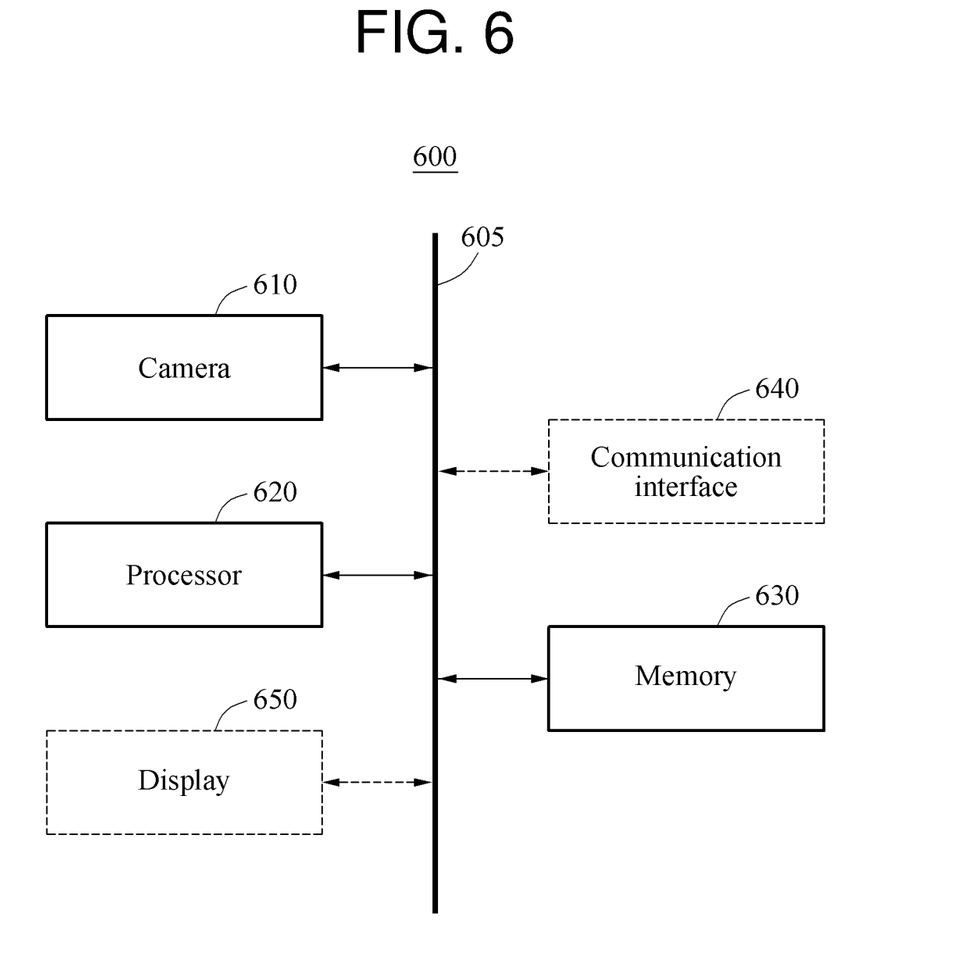
FIG. 6 illustrates an example of an apparatus for calculating a depth map.

610 of FIG. 6, or is acquired from an external device separate from the calculation apparatus.

The segments correspond to partial areas obtained by classifying or dividing the input image based on a predetermined criterion.

The calculation apparatus divides the input image into semantic segments by classifying an object included in the input image as a semantic unit belonging to one of 20 classes such as, for example, a road, a vehicle, a sidewalk, a person, an animal, the sky, and a building. However, 20 classes is merely an example, and there may be more or fewer than 20 classes. The classes of semantic units include, for example, stationary objects such as a road, the sky, and a building, and moving objects such as a moving person, a moving animal, and a moving vehicle. The calculation apparatus divides the input image into objects based on semantic units, discerns meanings of divided regions in pixel units, that is, determines which of the classes the divided regions belong to, and labels the regions with corresponding classes, thereby generating a segmentation image including semantic segments.

The calculation apparatus divides the input image into the semantic segments using, for example, a convolutional neural network (CNN), a deep neural network (DNN), or a support vector machine (SVM) trained to recognize the plurality of classes. The CNN may be a region-based CNN trained on various objects. However, these are merely examples, and the calculation apparatus may divide the input image into the semantic segments using various other machine learning schemes.

Further, the calculation apparatus divides the input image into depth segments based on depth values obtained from a depth map or a normal map inferred from the input image. The semantic segments and the depth segments may be the same as each other, or may be different from each other.

In operation 120, the calculation apparatus calculates reliabilities of the segments. The reliabilities are reliabilities with respect to depth information, for example, depth values, and position information, for example, position coordinates, of the segments. The calculation apparatus calculates first reliabilities of the semantic segments. Further, the calculation apparatus calculates second reliabilities of the depth segments.

The calculation apparatus calculates the reliabilities of the segments for each key frame among the frames. The key frame is a frame having all information related to an image in progress in a timeline, and may be, for example, a most important frame such as a start frame or an end frame of a single motion.

The calculation apparatus sets a reliability of a segment including a moving object to be relatively low, thereby excluding the corresponding segment from a process of estimating pose information of the camera and a process of calculating a depth map. An example of calculating the reliabilities of the segments in the calculation apparatus will be described further with reference to FIG. 2.

In operation 130, the calculation apparatus selects at least one of the segments based on the calculated reliabilities. The calculation apparatus selects a pixel to be a feature point used for the process of estimating the pose information of the camera and the process of calculating the depth map from the selected segment based on the reliabilities. The feature point is a point that is a feature in a frame, and includes information (u,v) corresponding to a two-dimensional (2D) position in the corresponding frame. Each frame includes a plurality of feature points. A general feature point detection algorithm known in the art is applicable to an operation of selecting feature points from a frame, and thus a detailed description will be omitted herein for conciseness. In one example, at least a portion of the feature points further include information corresponding to a depth value. For example, information corresponding to 3D positions of at least a portion of the feature points is obtained during the process of estimating the pose information of the camera used to capture the input image. A 3D position includes a depth value.

For example, a tracking loss may occur in a low gradient region such as a side of a building where a boundary between objects is unclear or has little change and is indistinct due to false negative selection that incorrectly determines and selects an error as a normality, or high frequency noise caused by a portion with a relatively high gradient resulting from a moving object or a piece of glass on a road in an image.

Segment(s) with reliabilities that may cause a tracking loss, that is, segment(s) with relatively low reliabilities, are excluded, and segment(s) with relatively high reliabilities are selected. The calculation apparatus estimates the pose information of the camera and calculates the depth map of the input image based on information extracted from the segment(s) with relatively high reliabilities, thereby improving a calculation speed and accuracy. An example of selecting at least one of the segments in the calculation apparatus will be described further with reference to FIGS. 3A through 3C.

In operation 140, the calculation apparatus estimates pose information of the camera with respect to the input image based on the selected segment. The pose information of the camera includes, for example, rotation information R and translation information T of the camera. The pose information of the camera is, for example, a 6-degree of freedom (DOF) camera pose including X (horizontal), Y (vertical), and Z (depth) corresponding to a pose of the camera, and pitch, yaw, and roll corresponding to an orientation of the camera.

The calculation apparatus estimates the pose information including a position of the camera used to capture the input image and a position (depth) of a captured object using homography that indicates a correlation between pixels in a series of successive images (frames). The calculation apparatus obtains the pose information of the camera using any of various simultaneous localization and mapping (SLAM) schemes such as, for example, feature-based SLAM, direct SLAM, extended Kalman filter (EKF) SLAM, fast SLAM, and large-scale direct monocular SLAM (LSD-SLAM). An example of estimating the pose information of the camera in the calculation apparatus will be described further with reference to FIG. 4.

In operation 150, the calculation apparatus calculates a depth map of the input image based on the pose information of the camera. The calculation apparatus calculates the depth map based on the coordinates (u,v) of the position of the camera, the rotation information R of the camera, and the translation information T of the camera obtained during the process of estimating the pose information of the camera.

Figure 2:
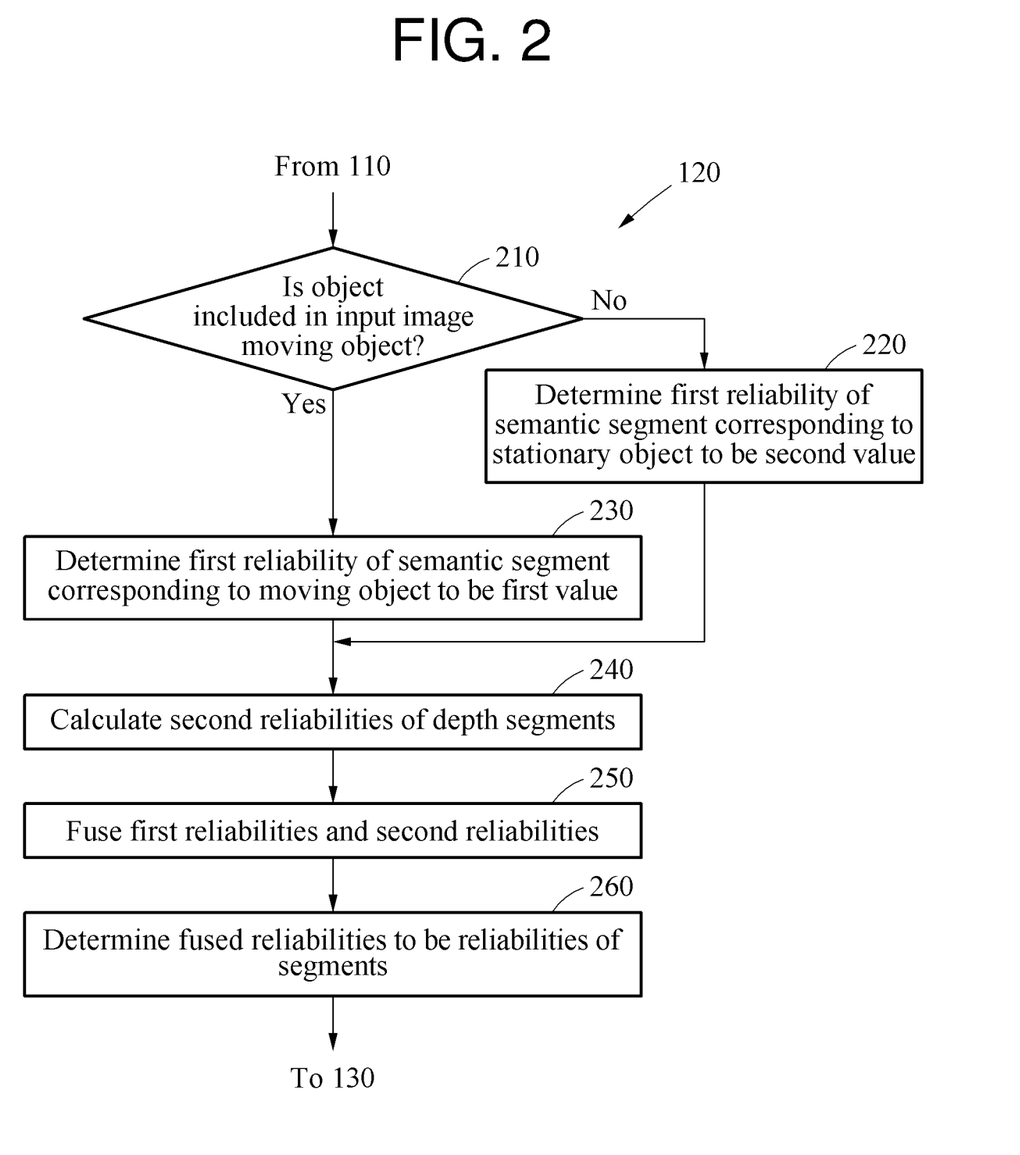
FIG. 2 illustrates an example of calculating reliabilities.

FIG. 2 illustrates an example of calculating reliabilities. Referring to FIG. 2, the calculation apparatus calculates first reliabilities of semantic segments based on whether an object included in an input image is a moving object.

In operation 210, the calculation apparatus determines whether an object included in the input image is a moving object. In response to a determination that the object is not a moving object, that is, in response to a determination that the object is a stationary object, the calculation apparatus determines a first reliability of a semantic segment corresponding to the stationary object to be a second value in operation 220. The second value is, for example, "1".

In response to a determination that the object is a moving object, the calculation apparatus determines a first reliability of a semantic segment corresponding to the moving object to be a first value in operation 230. The first value is, for example, "0". The calculation apparatus sets a reliability of a segment causing a tracking loss like a moving object or a segment having noise to be relatively low, thereby excluding use of the corresponding segment from estimation of the pose information of the camera or calculation of the depth map.

In operation 240, the calculation apparatus calculates second reliabilities $R_{Si}$ of the depth segments. The calculation apparatus calculates the second reliabilities $R_{Si}$ of the depth segments using Equation 1 below.

$$\mathcal{R}_{s_i} = \frac{1}{\sum_{u \in \Omega_{s_i} \in \Omega_{k_i}} \left(\mathcal{D}_{k_j}(u') - \left[T_{k_j}^{k_i} v_{k_i}(u)\right]_3\right)^2} \quad (1)$$

In Equation 1, $k_i$ denotes a current key frame i, and $k_j$ denotes a subsequent key frame j which is nearest to the current key frame i. $\mathcal{D}$ denotes a depth map, and $T_{k_j}^{k_i}$ denotes a transformation matrix from $k_i$ to $k_j$. $\Omega_{s_i}$ denotes an image region belonging to a segment i, and $\Omega_{k_i}$ denotes an image region in the current key frame i.

$v_{k_i}(\mathcal{u}) = K^{-1} \dot{u} \mathcal{D}_{k_i}(\mathcal{u})$ is satisfied. K denotes an intrinsic matrix, $\mathcal{u}$ denotes pixel coordinates, and $\dot{u}$ denotes a homogeneous representation of $\mathcal{u}$. $\mathcal{D}_{k_i}(\mathcal{u})$ denotes a depth map of the pixel coordinates u in the current key frame i. $\mathcal{u}' = \pi K T_{k_j}^{k_i} K^{-1} \dot{u} \mathcal{D}_{k_i}(\mathcal{u})$ is satisfied.

In Equation 1, $\mathcal{D}_{k_j}(\mathcal{u}')$ denotes the subsequent key frame j being a target, and $[T_{k_j}^{k_i} v_{k_i}(\mathcal{u})]_3$ denotes a warped host, that is, a warped current key frame i.

In operation 250, the calculation apparatus fuses the first reliabilities and the second reliabilities. The calculation apparatus fuses the first reliabilities of the semantic segments and the second reliabilities of the depth segments using Equation 2 below.

$$\mathcal{R}_{fused}(\mathcal{u}) = \mathcal{R}_{s_i}(\mathcal{u}) \cdot \mathcal{R}_{semantic}(\mathcal{u}) \quad (2)$$

In Equation 2, $\mathcal{R}_{s_i}(\mathcal{u})$ denotes a reliability of a depth segment at the pixel coordinates $\mathcal{u}$ calculated in Equation 1, and $\mathcal{R}_{semantic}(\mathcal{u})$ denoted a reliability of a semantic segment at the pixel coordinates $\mathcal{u}$.

In operation 260, the calculation apparatus determines the fused reliabilities to be the reliabilities of both the semantic segments and the depth segments.

Figure 3A:
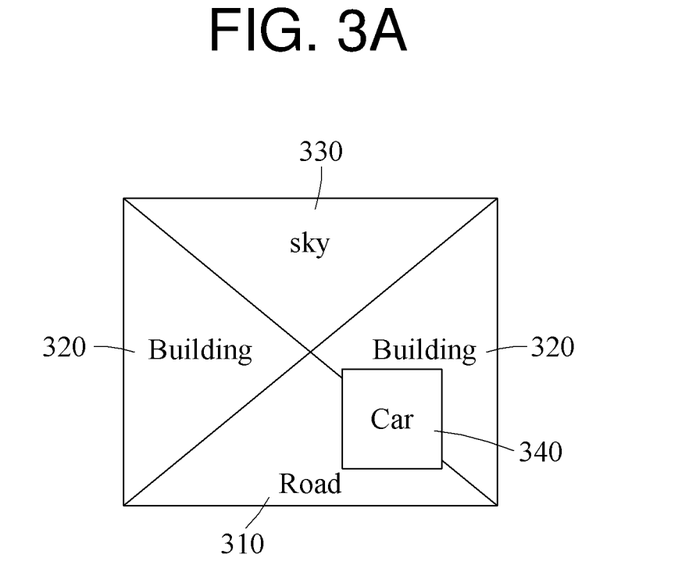
FIGS. 3A through 3C illustrate an example of selecting at least one segment.
Figure 3B:
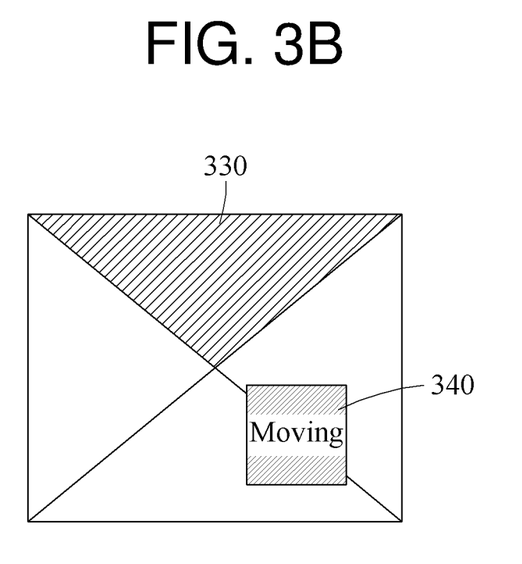
Figure 3C:
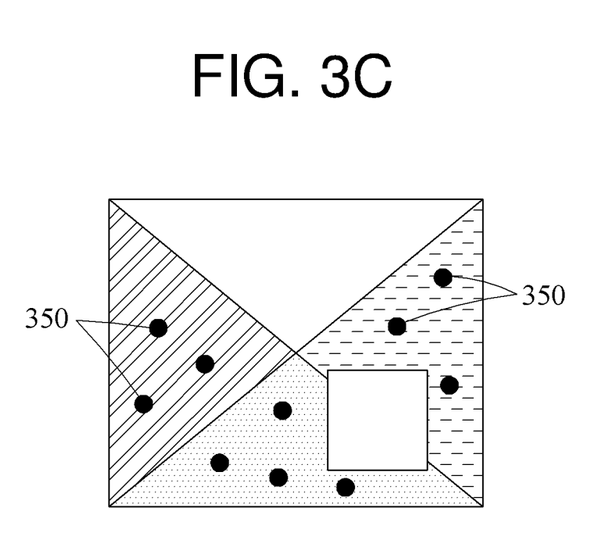

FIGS. 3A through 3C illustrate an example of selecting at least one segment. Referring to FIG. 3A, an input image divided into semantic segments 310, 320, 330, and 340 is illustrated. As described above, the calculation apparatus divides an input image into semantic segments by classifying an object included in the input image as a semantic unit. Hereinafter, for ease of description, an example of selecting at least one of the semantic segments will be described. However, the same process is also applicable to the depth segments.

For example, based on meanings of objects included in the input image, a road is classified as the segment 310, buildings are classified as the segment 320, the sky is classified as the segment 330, and a car is classified as the segment 340. For example, as shown in FIG. 3B, among the segments 310, 320, 330, and 340, high frequency noise occurs in the segment 330 corresponding to the sky due to a sudden flash of sunlight reflected by a flying object, and the car classified as the segment 340 is a moving object. In this example, the calculation apparatus sets a reliability of the segment 330 with the high frequency noise to be relatively lower than reliabilities of the noise-free segments. The reliability of the segment 340 corresponding to the moving object is set to, for example, "0".

The calculation apparatus excludes a segment that may cause tracking loss or a segment with a relatively low reliability, and selects segment(s) with relatively high reliabilities. For example, as shown in FIG. 3C, the calculation apparatus selects the segment 310 corresponding to the road and the segment 320 corresponding to the buildings, and performs camera pose information estimation and depth map calculation based on information extracted from the selected segments 310 and 320, for example, information related to pixel(s) 350.

Figure 4:
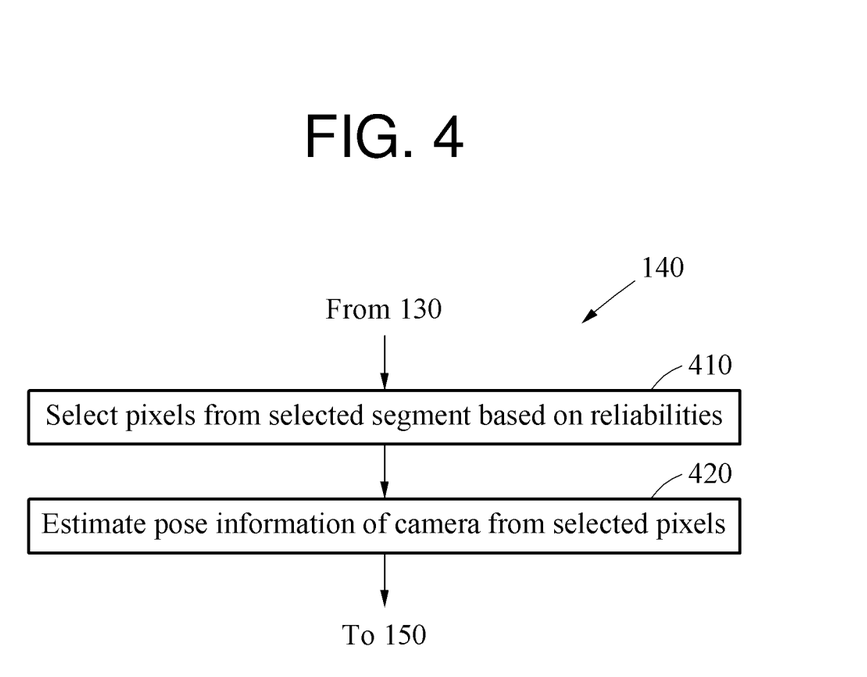
FIG. 4 illustrates an example of estimating pose information of a camera.

FIG. 4 illustrates an example of estimating pose information of a camera. Referring to FIG. 4, in operation 410, the calculation apparatus selects pixels from the selected segment based on the reliabilities. In this example, the reliabilities are reliabilities that were fused in operation 250 of FIG. 2, that is, the first reliabilities and the second reliabilities. The calculation apparatus selects the pixels from the selected segment in proportion to the reliabilities. For example, the calculation apparatus selects pixels from a segment with a highest reliability. The calculation apparatus selects pixels equally from segments in a descending order based on the reliabilities. The calculation apparatus selects a relatively large number of pixels from segments with higher reliabilities, and selects a fewer number of pixels from segments with lower reliabilities.

In operation 420, the calculation apparatus estimates pose information of the camera from the selected pixels. The calculation apparatus estimates the pose information of the camera from 3D points corresponding to pixels having depth values. The calculation apparatus estimates the pose information of the camera by applying a cost function $E_{pj}$ to the selected segment as expressed by Equation 3 below.

$$E_{Pj} := \sum_{p \in N_P} w_{\mathcal{R}_{fused}(p)} \left\| (I_j[p'] - b_j) - \frac{t_j e^{a_j}}{t_i e^{a_i}} (I_i[p] - b_i) \right\|_\gamma \quad (3)$$

In Equation 3, $I_i$ denotes a reference frame, and $I_j$ denotes a target frame. p denotes a point, that is, a pixel in the reference frame $I_i$, and is expressed as $p \in \Omega_i$. $N_P$ denotes a set of pixels included in a sum of squared differences (SSD). $t_i$ denotes an exposure time of the reference frame $I_i$, and $t_j$ denotes an exposure time of the target frame $I_j$. $\|\cdot\|_\gamma$ denotes a Huber norm, which is a loss function. $w_{\mathcal{R}_{fused}(p)}$ denotes a weight based on fused reliabilities, and $e^{-a_i}(I_i - b_i)$ denotes an affine brightness transfer function. $b_i$ denotes a brightness of the reference frame, and $b_j$ denotes a brightness of the target frame. $a_i$ denotes a parameter of a brightness transfer function with respect to the reference frame, and $a_j$ denotes a parameter of a brightness transfer function with respect to the target frame.

p' denotes a position of a projected point p with an inverse depth $d_p$, and is obtained using Equation 4 below.

$$p' = \Pi_c(R\Pi_c^{-1}(p, d_p) + t) \quad (4)$$

In Equation 4, $$\begin{bmatrix} R & t \\ 0 & 1 \end{bmatrix} := T_j T_i^{-1}$$

is satisfied, where $T_i \in SE(3)$. $T_i \in SE(3)$ indicates that camera poses are expressed using a transformation matrix.

A full photometric error is expressed by Equation 5 below.

$$E_{photo} := \sum_{i \in \mathcal{F}} \sum_{p \in \mathcal{P}_i} \sum_{j \in obs(p)} E_{pj} \quad (5)$$

In Equation 5, i runs over all frames $\mathcal{F}$, p runs over all points $\mathcal{P}_i$ in a frame i, and j runs over all frames obS(p) in which p is visible.

Equations 3 through 5 are used to set a brightness between frames. Since the brightness between frames affects a depth value, a brightness difference is adjusted using the above equations to calculate a more accurate depth map.

Figure 5:
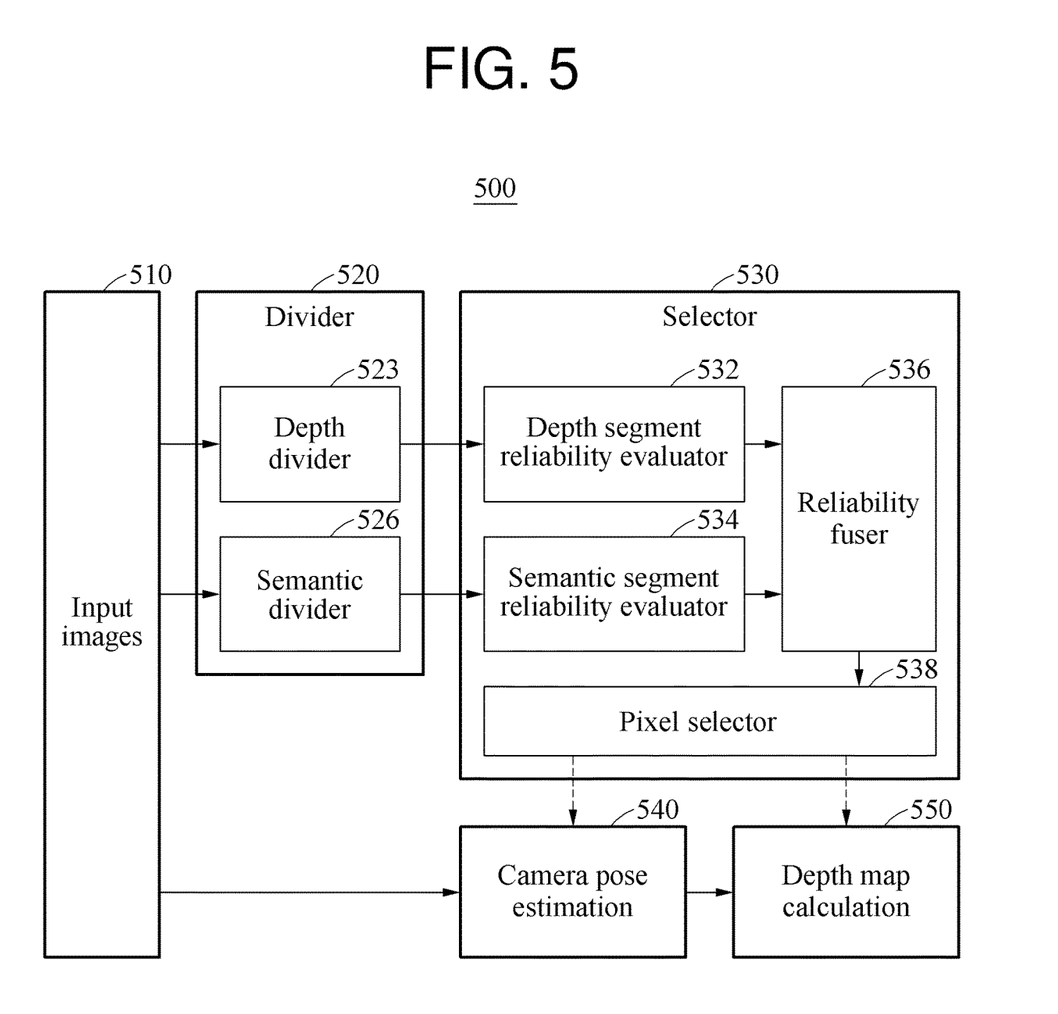
FIG. 5 illustrates an example of an operation of an apparatus for calculating a depth map.

FIG. 5 illustrates an example of an operation of an apparatus for calculating a depth map. Referring to FIG. 5, a calculation apparatus 500 includes a camera 510, a divider 520, a selector 530, a tracker 540, and a mapper 550. The divider 520, the selector 530, the tracker 540, and the mapper 550 may be implemented by a processor 620 of FIG. 6.

The camera 510 captures a series of input images.

The divider 520 divides an input image into segments. The divider 520 includes a depth divider 523 configured to divide the input image into depth segments based on depth values, and a semantic divider 526 configured to divide the input image into semantic segments corresponding to semantic units.

The selector 530 selects at least one segment to be used to track a camera pose and calculate a depth map from the segments based on the reliabilities of the segments. For example, the selector 530 selects at least one segment in proportion to the reliabilities of the segments.

The selector 530 includes a depth reliability evaluator 532, a semantic reliability evaluator 534, a reliability fuser 536, and a pixel selector 538.

The depth reliability evaluator 532 evaluates or calculates reliabilities of the depth segments. The semantic reliability evaluator 534 evaluates or calculates reliabilities of the semantic segments.

The reliability fuser 536 fuses the reliabilities of the depth segments and the reliabilities of the semantic segments, and determines the fused reliabilities to be the reliabilities of both the depth segments and the semantic segments.

The pixel selector 538 selects a segment based on the fused reliabilities, and selects pixels from the selected segment.

The tracker 540 calculates 6-DOF pose information of the camera 510 including a pose and an orientation of the camera 510. The tracker 540 continuously tracks new input images, and calculates pose information of the camera 510 in a current frame based on pose information of the camera 510 in a previous frame. In this example, the tracker 540 estimates the pose information of the camera 510 from pixels of a segment selected in the previous frame by the pixel selector 538. The tracker 540 estimates the pose information of the camera 510, for example, rotation information and translation information of the camera 510, by solving the cost function with respect to the selected segment.

The mapper 550 calculates a depth map by calculating a depth of a captured object. The mapper 550 calculates the depth map of the input image based on the pose information of the camera 510 estimated from the pixels of the selected segment. The mapper 550 calculates the depth map based on depth values calculated based on coordinates (u,v) of the position of the camera 510, the rotation information R of the camera 510, and the translation information T of the camera 510.

The mapper 550 generates a new key frame or refines a current key frame based on the tracked frames. For example, in a case in which an input image does not include objects captured in a previous frame since the camera 510 used to capture the input image has moved a far distance, the calculation apparatus 500 generates a new key frame from last tracked frames. When the new key frame is generated, a depth map of the corresponding key frame is initialized by projecting a point from the previous key frame onto the new key frame. A frame not corresponding to the new key frame, among the tracked frames, is used to redefine the current key frame.

A depth map newly calculated by the mapper 550 is added to the newly generated key frame or the redefined key frame.

FIG. 6 illustrates an example of an apparatus for calculating a depth map. Referring to FIG. 6, an apparatus 600 for calculating a depth map, hereinafter, the "calculation apparatus" 600, includes the camera 610, the processor 620, and a memory 630. The calculation apparatus 600 may further include a communication interface 640 and/or a display 650. The camera 610, the processor 620, the memory 630, the communication interface 640, and the display 650 communicate with each other through a communication bus 605.

The calculation apparatus 600 may be any of electronic devices configured to implement various AR applications in real time, for example, an AR HUD, AR/VR glasses, an autonomous vehicle, an intelligent vehicle, a smart phone, and a mobile device.

The camera 610 acquires an input image. The camera 610 is, for example, a red, green, and blue (RGB) camera, or a red, green, and blue-depth (RGB-D) camera. The input image is an image input into the calculation apparatus 600, and is, for example, a live image or a moving picture. The input image may be a monoscopic image or a stereoscopic image. The input image includes a plurality of frames. The input image is captured through the camera 610, or is acquired from an external device outside the calculation apparatus 600.

The processor 620 divides the input image into segments, calculates reliabilities of the segments, and selects at least one of the segments based on the reliabilities. The processor 620 estimates pose information of the camera 610 with respect to the input image based on the selected segment. The processor 620 calculates a depth map of the input image based on the pose information of the camera 610.

The processor 620 divides the input image into semantic segments by classifying an object included in the input image as a semantic unit. The processor 620 divides the input image into depth segments based on a depth value of the input image. In another example, the processor 620 divides the input image into the semantic segments and the depth segments.

The processor 620 calculates first reliabilities of the semantic segments, or calculates second reliabilities of the depth segments. In another example, the processor 620 calculates the first reliabilities of the semantic segments and the second reliabilities of the depth segments. The processor 620 calculates the first reliabilities of the semantic segments based on, for example, whether an object included in the input image is a moving object.

The processor 620 fuses the first reliabilities and the second reliabilities, and determines the fused reliabilities to be the reliabilities of both the semantic segments and the depth segments. The processor 620 calculates the reliabilities of the segments for each key frame among the frames.

The processor 620 selects pixels from the selected segment based on the fused reliabilities, and estimates pose information of the camera 610 from the selected pixels. The processor 620 selects the pixels from the selected segment in proportion to the fused reliabilities.

The processor 620 estimates the pose information of the camera 610 by applying a cost function to the selected segment.

The processor 620 performs the method described with reference to FIGS. 1 through 5, or an algorithm corresponding to the method. The processor 620 executes a program, and controls the calculation apparatus 600. A program executed by the processor 620 is stored in the memory 630.

The memory 630 stores the input image and/or the plurality of frames. The memory 630 stores the pose information of the camera 610 estimated by the processor 620 with respect to the input image, the depth map of the input image calculated by the processor 620, and/or a 3D image reconstructed by the processor 620 using the depth image.

The memory 630 stores a variety of information generated during processing performed by the processor 620. Further, the memory 630 stores various data and programs. The memory 630 may be either one or both of a volatile memory and a non-volatile memory. The memory 630 includes a large-capacity storage medium such as a hard disk to store various data.

In one example, the calculation apparatus 600 receives an input image captured by an external device outside the calculation apparatus 600 through the communication interface 640. In this example, the communication interface 640 receives, together with the input image, pose information such as rotation information and translation information, position information, and/or calibration information of the external device used to capture the input image.

The display 650 displays the 3D image reconstructed using the depth map calculated by the processor 620.

The divider 520, the depth divider 523, the semantic divider 526, the selector 530, the depth reliability evaluator 532, the semantic reliability evaluator 534, the reliability fuser 536, the pixel selector 538, the tracker 540, and the mapper 550 in FIG. 5 in FIG. 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of calculating a depth map, the method comprising:
   dividing an input image into segments;
   calculating first reliabilities of the segments by determining a first reliability of a segment corresponding to a moving object to be less than a first reliability of a segment corresponding to a stationary object;
   calculating second reliabilities of the segments based on depth values of the segments;
   selecting, from at least one of the segments, a number of pixels determined based on the first reliability and the second reliability of the at least one of the segments;
   estimating pose information of a camera with respect to the input image based on the pixels; and
   calculating a depth map of the input image based on the pose information of the camera.

2. The method of claim 1, wherein the dividing comprises either one or both of:
   dividing the input image into semantic segments by classifying the object included in the input image as a semantic unit; and
   dividing the input image into depth segments based on the depth values.

3. The method of claim 2, wherein the calculating of the reliabilities comprises either one or both of:
   calculating the first reliabilities of the semantic segments; and
   calculating the second reliabilities of the depth segments.

4. The method of claim 3, wherein the calculating of the first reliabilities comprises calculating the first reliabilities of the semantic segments based on whether the object included in the input image is the moving object.

5. The method of claim 3, wherein the calculating of the reliabilities further comprises:
   fusing the first reliabilities and the second reliabilities; and
   determining the fused reliabilities to be the reliabilities of both the semantic segments and the depth segments.

6. The method of claim 5, wherein
   the selecting of the number of pixels comprises selecting the pixels from the least one segment based on the fused reliabilities, and
   the estimating comprises estimating the pose information of the camera from the selected pixels.

7. The method of claim 6, wherein the selecting of the pixels comprises selecting the pixels from the at least one segment in proportion to the fused reliabilities.

8. The method of claim 1, wherein the input image comprises frames,
   the frames comprise at least one key frame, and
   the calculating of the reliabilities comprises calculating the reliabilities of the segments for each of the at least one key frame.

9. The method of claim 1, wherein the estimating comprises estimating the pose information of the camera by applying a cost function to the at least one segment.

10. A non-transitory computer-readable medium storing instructions that, when executed by a processor, cause the processor to perform the method of claim 1.

11. An apparatus for calculating a depth map, the apparatus comprising:
    a camera configured to acquire an input image; and
    a processor configured to:
        divide the input image into segments,
        calculate first reliabilities of the segments by determining a first reliability of a segment corresponding to a moving object to be less than a first reliability of a segment corresponding to a stationary object,
        calculate second reliabilities of the segments based on depth values of the segments,
        select, from at least one of the segments, a number of pixels determined based on the first reliability and the second reliability of the at least one of the segments,
        estimate pose information of the camera with respect to the input image based on the pixels, and
        calculate a depth map of the input image based on the pose information of the camera.

12. The apparatus of claim 11, wherein the processor is further configured to either one or both of:
- divide the input image into semantic segments by classifying the object included in the input image as a semantic unit, and
- divide the input image into depth segments based on the depth values of the input imago.

13. The apparatus of claim 12, wherein the processor is further configured to either one or both of:
- calculate the first reliabilities of the semantic segments, and
- calculate the second reliabilities of the depth segments.

14. The apparatus of claim 13, wherein the processor is further configured to calculate the first reliabilities of the semantic segments based on whether the object included in the input image is the moving object.

15. The apparatus of claim 13, wherein the processor is further configured to:
- fuse the first reliabilities and the second reliabilities, and
- determine the fused reliabilities to be the reliabilities of both the semantic segments and the depth segments.

16. The apparatus of claim 15, wherein the processor is further configured to:
- select the pixels from the at least one segment based on the fused reliabilities, and
- estimate the pose information of the camera from the selected pixels.

17. The apparatus of claim 16, wherein the processor is further configured to select the pixels from the at least one segment in proportion to the fused reliabilities.

18. The apparatus of claim 11, wherein the input image comprises frames,
the frames comprise at least one key frame, and
the processor is further configured to calculate the reliabilities of the segments for each of the at least one key frame.

19. The apparatus of claim 11, wherein the processor is further configured to estimate the pose information of the camera by applying a cost function to the at least one segment.

20. A method of calculating a depth map, the method comprising:
- determining a first reliability of at least one portion to be greater than a first reliability of another portion of an input image captured by a camera, the at least one portion having a characteristic enabling accurate pose estimation of the camera;
- calculating a second reliability of the at least one portion based on a depth value of the at least one portion;
- selecting, from the at least one portion, a number of pixels determined based on the first reliability and the second reliability of the at least one portion;
- estimating pose information of the camera based on the selected number of pixels; and
- calculating a depth map of the input image based on the pose information of the camera.

21. The method of claim 20, wherein the characteristic enabling accurate pose estimation of the camera is a characteristic in which the at least one portion does not have high-frequency noise and is not a part of a moving object.

22. The method of claim 20, further comprising:
- calculating the reliability of the at least one portion; and
- selecting the pixels from the at least one portion in proportion to the reliability so that the greater the reliability, the greater the number of pixels that are selected from the at least one portion;
- wherein the estimating comprises estimating the pose information of the camera from the selected pixels.

23. The method of claim 20, further comprising dividing the input image into portions based on classes of semantic units so that each of the portions is classified in one of the classes of semantic units;
wherein the selecting comprises selecting the at least one portion from the divided portions.

24. The method of claim 23, wherein the classes comprise classes of stationary objects and classes of moving objects; and
the selecting comprises selecting the at least one portion from the classes of stationary objects.

* * * * *